Jan. 26, 1965 G. R. STIBITZ 3,167,266
OBJECT RETRIEVAL SYSTEM
Filed Sept. 20, 1961 4 Sheets-Sheet 1

Jan. 26, 1965 G. R. STIBITZ 3,167,266

OBJECT RETRIEVAL SYSTEM

Filed Sept. 20, 1961 4 Sheets-Sheet 2

Jan. 26, 1965 | G. R. STIBITZ | 3,167,266

OBJECT RETRIEVAL SYSTEM

Filed Sept. 20, 1961 | 4 Sheets-Sheet 3

Jan. 26, 1965 G. R. STIBITZ 3,167,266

OBJECT RETRIEVAL SYSTEM

Filed Sept. 20, 1961 4 Sheets-Sheet 4

United States Patent Office 3,167,266
Patented Jan. 26, 1965

3,167,266
OBJECT RETRIEVAL SYSTEM

George R. Stibitz, Underhill, Vt.
(R.F.D., Potter Place, N.H.)

Filed Sept. 20, 1961, Ser. No. 140,168
2 Claims. (Cl. 242—55.13)

This invention relates to the automatic retrieval of any one of a multiplicity of stored objects, and the replacement of said retrieved object in its storage location.

I shall describe my invention in connection with a player of pre-recorded tape, although it will be apparent that the invention is not limited thereto, but could find many applications; for example, in the electronic computer field, where magnetic tape and punched tape are frequently used, in equipment auxiliary to the computer, for the storage of recorded numerical information or programs. An application, apart from the field of magnetic or punched tape could be made to the storage, retrieval, reading, and return to storage of microfilm. I do not wish to limit the possible applications of my preferred embodiment to storage of such objects as may be wound upon reels, since applications could be made in the retrieval of cards or books, or other objects.

Some modifications of my preferred embodiment would be necessary for other applications, but these modifications would be obvious to anyone skilled in the art.

As before mentioned, I shall describe my invention of an object retrieval system as it relates to the automatic retrieval of any one of a multiplicity of stored reels of pre-recorded magnetic tape, to drawing said tape through the reading head, and, upon a signal received when the reading is accomplished, to rewinding the tape upon its own reel.

Record changers, such as those in the coin-operated instruments commonly called "juke boxes," are capable, upon receipt of a signal from a push button indicating a choice, of automatically selecting the desired phonograph disk, placing it upon the turn-table, adjusting the stylus to play the record, and when the record has been played, returning it to its proper storage location. There appears to be no analogous automatic device for pre-recorded magnetic tapes, although the production of such tapes is increasing rapidly, as is the manufacture of instruments on which to play them.

It is an object of my invention to provide a tape selector-and-changer which obviates the existing problem of manual tape handling, including the threading of the tape from its own reel around the capstan, through the head and onto the takeup reel. This I accomplish, in part, by the use of the conventional takeup reel, a capstan with a driving motor and a reading head, all of which are standard on tape players.

According to my invention I propose to make automatic the pickup, threading, and rewinding of any one of a multiplicity of tapes stored in the magazine, in part, by the use of thin metal leaders terminating in hooks, permanently attached to the free end of each one of the stored tapes.

According to my invention, I also propose that a thin metal leader terminating in a hook will be permanently attached to the takeup reel.

It is a feature of my invention that the stored tapes shall be selected by means of a system of tracks and switches, which switches are responsive to signals received from selector keys.

I propose to control the sequence of operations of the system by means of relays used as a stepping chain, a method well known in the telephone and computer art. It will be apparent to anyone skilled in the art that stepping switches, or other sequential mechanisms could be substituted for the relay stepping chain.

The specific nature of the invention, as well as the objects and advantages thereof, will clearly appear from a description of a preferred embodiment as shown in the accompanying drawings in which.

Figure 1:
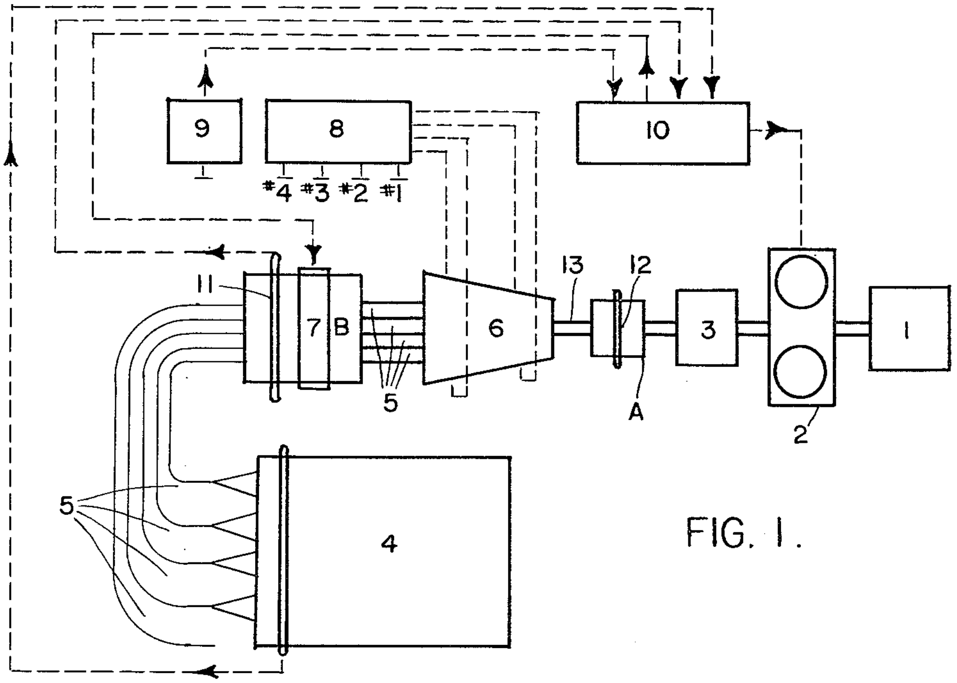
FIG. 1 is a schematic of my invention.

I will now give a general description of how my invention operates, and relate the description to FIG. 1. Dashed lines in this figure indicate electrical paths. It is assumed that four tapes are stored in the magazine 4. It will be understood that only four tapes are shown in the interests of simplicity, but that my invention is not limited to this number.

One of the selector keys 8, all of which are numbered to correspond to the stored tapes and tracks, is pressed to set the track switches 6. Let us choose tape #1, for example. Key #1 is pressed, after which start key 9 is pressed, which starts the capstan motor 2.

The retriever tape and hook (not shown in FIG. 1) is then driven from retriever-rest A, via the single track 13, through the switch 6, to the pickup-release B. There the retriever hook picks up the hook of the selected tape #1. The capstan then reverses, drawing the retriever (now attached to tape #1) back through the switch 6, via the single track 13, through the reading head 3 and onto the takeup reel 1. The tape is read at the reading head in the conventional way. After the selected tape has been completely read, a signal causes the capstan to reverse, which capstan then draws tape #1 from the takeup reel and permits it to rewind on its own reel in the magazine 4.

When the tape has been drawn from the takeup reel, the retriever hook remains engaged with the hook on the leader of tape #1 until such time as the engaged hooks reach the pickup-release B. Here, upon a signal received that the hooks are at B, said hooks are disengaged. The hook on tape #1 remains at point B until such time as tape #1 is selected again. The retriever tape is retracted until the retriever hook arrives at the retriever-rest A. At this time the capstan motor shuts off until another selection of tape is made and the start key pressed.

It will be understood that while this description is restricted to manual selection of tapes by use of selector keys, it will be obvious to anyone skilled in the art that the process of selection could be accomplished by programming, without departing from the spirit of my invention.

*Tracks and switches*

A basic element of my invention resides in the system of switches and tracks which cooperate with the other elements of the device.

Figure 2:
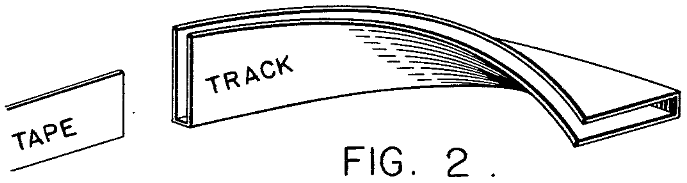
FIG. 2 is a perspective view of a track used in my invention.

Each track, an enlarged view of which is shown in FIG. 2, could be made of metal, plastic, or other suitable material. I have used sheet metal approximately .015 inch thick. This is folded as shown in such manner that the total width of each track is approximately .10 inch, and the total depth approximately .35 inch. Each track is bent where required with a minimum of 1 inch radius at locations through which the tape alone is passing. A minimum of approximately 5 inches radius is required at certain locations for the passage of the metal leaders and hooks. Also, each track may, if desired for convenience in arranging the magazine, be given a twist about its axis so as to rotate the plane of the tape passing through it by 90°.

A multiplicity of such tracks, 128 for example, could be stacked side by side closely enough together as to occupy a space approximately 13 inches wide. Each tape stored in the magazine has its free end positioned, via its own track, at B (FIG. 1) until such time as it is selected.

To eliminate the possibility of tapes jumping, the tracks are covered except at the switching points, the retriever-rest and pickup-release. For simplicity, the cover for the tracks has not been shown in the figures.

The arrangement of tracks is similar in function and operation to the switching yard of a railroad. In FIG. 1 it is seen that there is a single track 13 between point A and the switches 6.

This track branches at first into two tracks with a Y-shaped junction. (The branching and switching operations will be seen in detail in FIG. 4.) At this, and all succeeding Y-shaped junctions, is a tongue of thin flexible metal which can be swung from side to side by the actuation of a switch bar.

Figure 3:
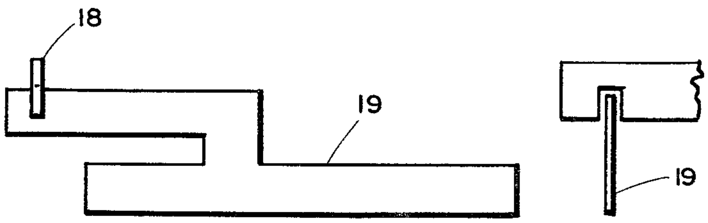
FIG. 3 is a view of the switch tongue and switch bar.

The switch tongues 19 and 21 engage switch bars 18 and 20, which bars are actuated by solenoids 14, 15, 16 and 17. To insure that all tongues engaging a particular switch bar shall be thrown completely to one side or the other, even when, because of accidental variations in track widths, the motions required of the coacting tongues vary somewhat, I form the tongues as shown in FIG. 3. Because of the compliance between the switch bar 18 and the tongue 19, the switch bar can be driven beyond the point at which the tip of the tongue makes contact with the wall of the track, and inequalities between tracks are thereby overcome.

To prevent the switches from taking an intermediate position, because of bounce in the solenoids or other disturbances, I use an over-center spring (not shown) in the conventional manner, to cause the bar to seek one or the other of its extreme positions.

Figure 4:
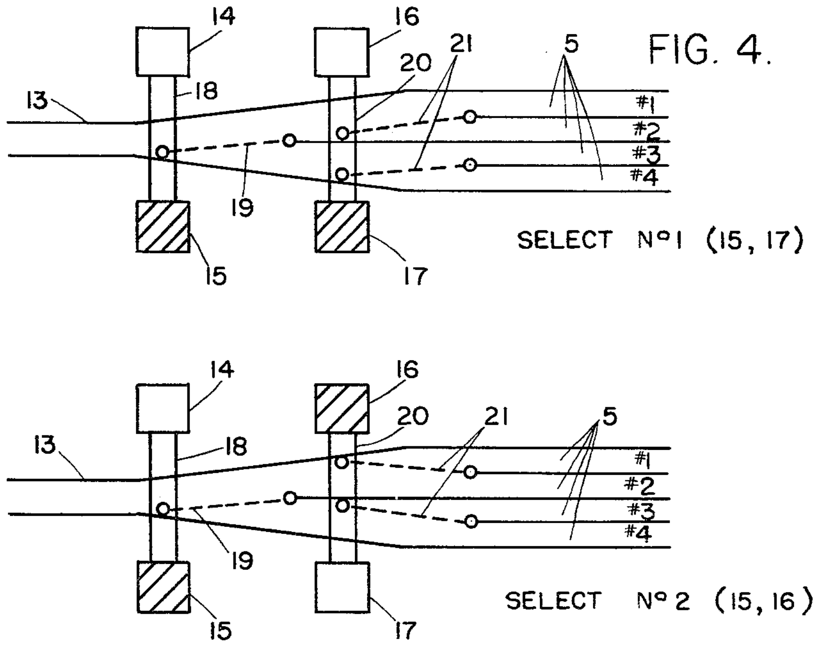
FIG. 4 is a view showing how the solenoids actuate switches to close or open tracks.

In FIG. 4 I show four tracks with three Y-shaped junctions and two selector switches. It will be understood that only four tracks are shown in the interests of simplicity, but that my invention is not limited to this number, and by repeated application of the same principles a much larger number may be employed. For example, with the number of tracks doubling at each selector switch, 7 selector switches could be set to open or close any one of 128 tracks in response to a signal from one of the selector keys indicating a choice of tape.

Again, refer to FIG. 4, first picture. If it is desired to select tape #1, for example, the two solenoids 15 and 17 will be actuated to pull the tongues 19 and 21 downward to clear track #1, and close tracks #2, #3 and #4. To select tape #2, it will be seen in the second picture of FIG. 4 that at the first track junction, solenoid 15 is actuated to close tracks #3 and #4, and solenoid 16 is actuated to close track #1. Thus, the retriever is forcibly guided into track #2 as desired. Similarly can tracks #3 or #4 be cleared.

*Leaders*

I have attached a thin metal leader to the free end of each tape in the magazine, which leader is of the same width as the tape, and, in order to move easily in the track is approximately .005 inch thick. The free end of the magazine reel leader 26 is shaped as shown in FIG. 5 with an attached hook 27.

This hook is covered by a shield of metal 29, and a shoulder 28 is provided to engage the stop 31 (seen in FIG. 6), in its corresponding track at pickup-release B. Also, the shield 29 prevents the hooks from slipping accidentally from engagement. Thus the free end of the leader from each magazine tape remains at all times at pickup-release B, except for the period during which it is being used; and said leader is never completely rewound on the magazine reel.

Figure 5:
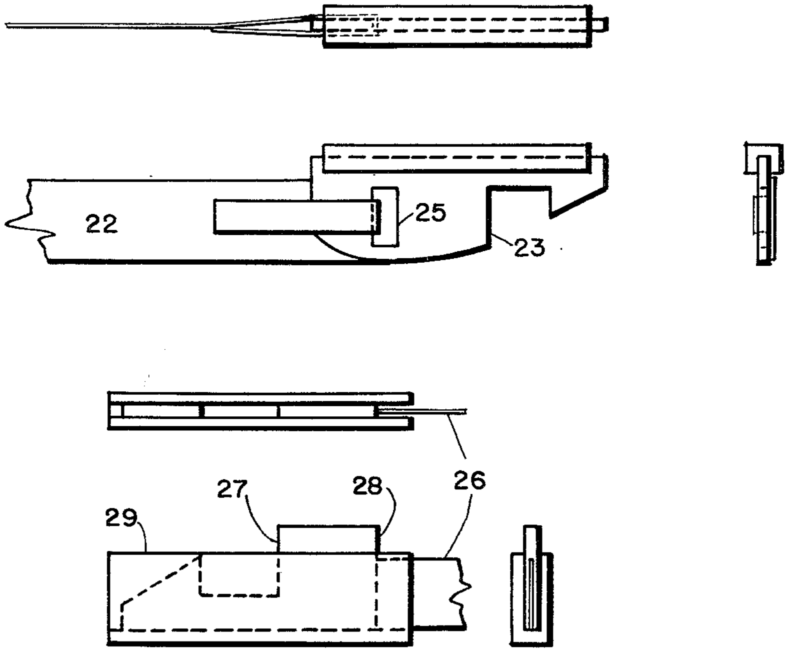
FIG. 5 is a view of the hooks which terminate the leaders from the magazine reels and the takeup reel.

See FIG. 5. To the takeup reel I have attached, permanently, the same sort of thin metal leader 22 which is long enough to reach pick-release B without being pulled off the takeup reel. This retriever leader 22, also has a shielded hook 23 in its free end which is called the retriever hook. The shield 24 positions the hook in the center of the track at pickup.

I have constructed the retriever hook 23 differently from the reel hook 27, in that I have employed a pivot 25 so that the retriever hook may mount the reel hook for engamement, or in reverse, dismount for disengagement.

*Hook pickup and release*

Figure 6:
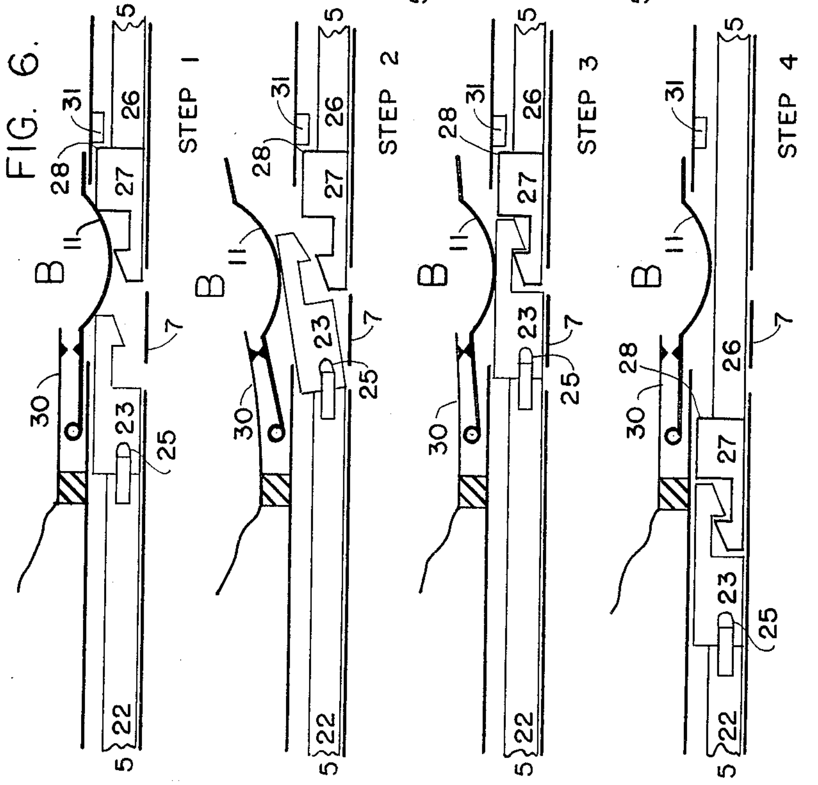
FIG. 6 is a 4-step view showing how a hook pickup is accomplished.

See FIG. 6. Step 1 shows the retriever hook 23 approaching the magazine reel hook 27 which is at pickup-release B. I have placed a feeler 11 which crosses all tracks at pickup-release B, slightly bent to fit into a slot in the tracks, and shallow enough so that it is capable of being hit by the hooks only, which are wider than the leaders or tapes. Said feeler is held down by a light spring and connected to the contact 30 at B.

When the retriever hook arrives at B, having been driven to pick up the selected reel hook, the retriever hook hits the feeler, and the consequent raising of said feeler actuates a contact 30 at B. See step 2 in FIG. 6. As the retriever hook mounts the reel hook the feeler is raised still further, but is pressing down constantly, with the result that when the retriever hook has passed the mounting point, the retriever hook drops into engagement with the reel hook and the pressure of the feeler locks the hooks. See Step 3, FIG. 6. Step 4 in FIG. 6 shows the retriever tape drawing the magazine tape to the left, to pass through the switches and retriever-rest to the reading head.

Figure 7:
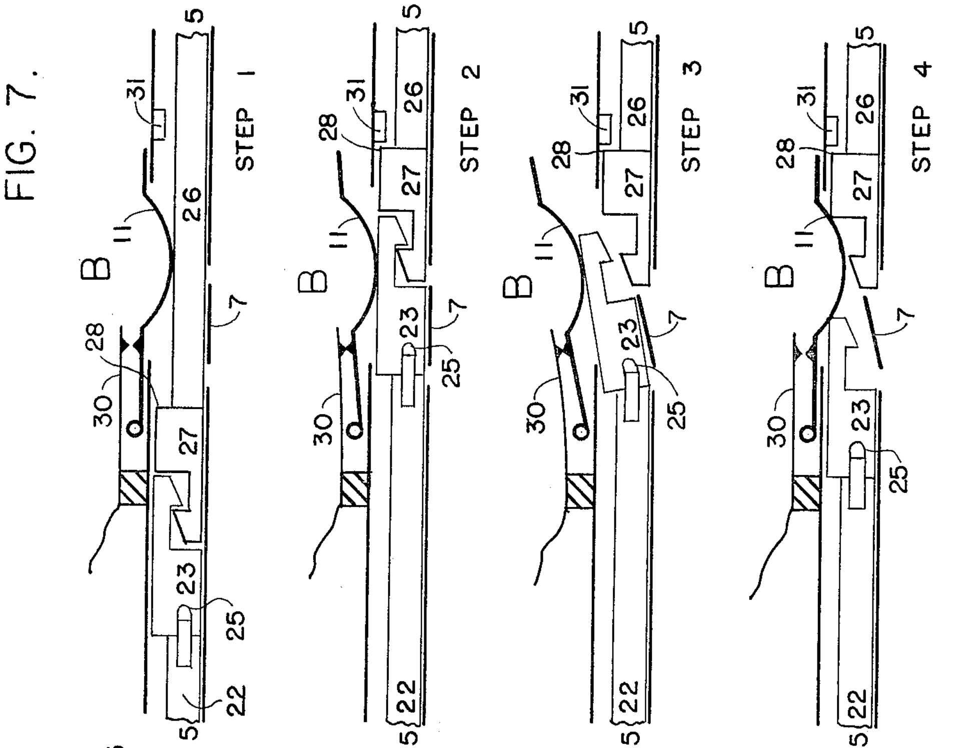
FIG. 7 is a 4-step view showing how a hook release is accomplished.

Step 1 of FIG. 7 shows the engaged tapes arriving from the left after the reading operation. I have mounted a rocker arm 7 which crosses all tracks, underneath B. During the release operation when the hooks, still engaged, arrive at B (see step 2 in FIG. 7) the feeler 11 closes contact 30 and signals the controls which advance to the next step and signal the rocker arm 7 which is then raised to press against the retriever hook 23 forcing it upward sufficiently to compel it to disengage from the reel hook 27. See step 3, FIG. 7. Step 5 in FIG. 7 shows the retriever tape and hook being retracted, with magazine hook 26 remaining in place.

*Rewind*

Figure 8:
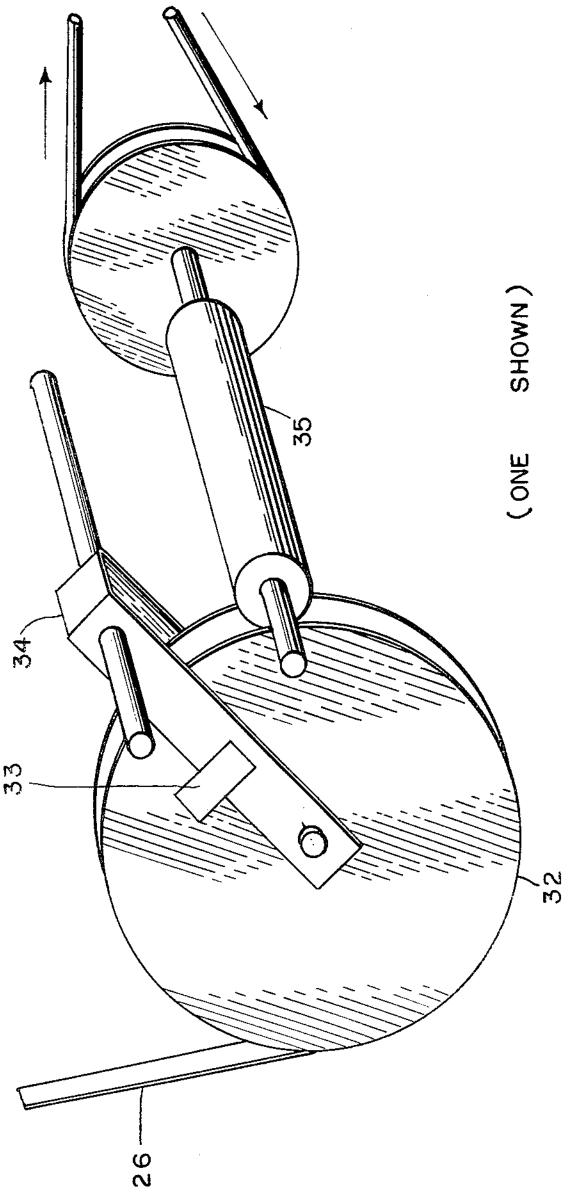
FIG. 8 is a view of a magazine reel with brake, bracket and friction drum.

The magazine reels in the preferred embodiment of my invention are rewound by a friction clutch which may be of the form shown in FIG. 8. I show only one reel 32 for simplicity, although it will be understood that a multiplicity of such reels will be used in an actual magazine.

A friction drum 35 adjacent to all reels is in continuous rotation, at least during the rewind period. The reels are mounted on individual brackets 34 which are pivoted in such a position that the weight of the reel and bracket tend to cause the periphery of the reel to press against the friction drum.

The rotating friction drum drives the reel in such a direction as to rewind the tape 26 attached thereto. When the tape has been rewound and the tape hook reaches B, the tension on the tape increases and exerts a force on the reel, which force tends to lift the reel clear of the friction drum. A light brake 33 acting on the reel 32 suffices to prevent the tape 26 from unwinding, and holds the reel free of the drum 35. This same brake keeps a suitable small tension on the tape during the playing cycle.

As noted previously, the capstan, reading head and takeup reel are of conventional design, except that a solenoid may be added to the capstan drive to change speed and direction of drive in ways well understood in the art.

It will be apparent that the embodiment shown is only exemplary, and that various modifications can be made in construction and arrangement within the scope of my invention as defined in the appended claims.

I claim:

1. Means for withdrawing and replacing any desired tape in a magazine containing a multiplicity of tapes, said means comprising a flexible retriever tape, tracks constructed to constrain said retriever tape and said desired tape to move longitudinally along predetermined paths, means constructed to drive said retriever through said tracks, switch means settable in response to received signals to clear or block certain paths and to coact with said drive means to deflect said retriever tape through selected tracks to said desired tape, and coupling means comprising a first hook pivoted at one end of said retriever tape, a second hook rigidly attached to the end of said desired tape, means for causing the engagement of said first and second hooks, and means for causing the disengagement of said first and second hooks.

2. A device substantially as shown herein comprising a multiplicity of tapes, a multiplicity of first coupling means each of said first coupling means being affixed to the terminal of one of said multiplicity of tapes, a multiplicity of positioning means each adapted to retain temporarily one of said multiplicity of first coupling means in a predetermined location, second coupling means adapted to couple to any of said first coupling means that may be in contiguity to said second coupling means, actuating means constructed to cause said first and said second coupling means to engage or to disengage, flexible retrieving means affixed to said second coupling means, driving means constructed to drive said retrieving means, and switching means responsive to signals indicative of a selected one of said positioning means, said switching means and said driving means coacting with said retrieving means to cause contiguity of said second coupling means and that one of said first coupling means retained in said selected positioning means.

References Cited by the Examiner

UNITED STATES PATENTS

| | | | |
|---|---|---|---|
| 2,863,991 | 12/58 | Mishelevich | 246—2 |
| 2,902,329 | 9/59 | Brink et al. | 346—74 |
| 2,909,128 | 10/59 | Keen | 104—88 |
| 2,941,738 | 6/60 | Burke et al. | 242—55.12 |
| 3,027,024 | 3/62 | Baume | 214—16.1 |
| 3,046,909 | 7/62 | Gorjanc | 104—88 X |

MERVIN STEIN, *Primary Examiner.*

JOSEPH P. STRIZAK, *Examiner.*